Dec. 8, 1959   E. G. RAGATZ   2,916,272
COLUMN TRAY-STRUCTURE
Filed Aug. 16, 1957   4 Sheets-Sheet 1
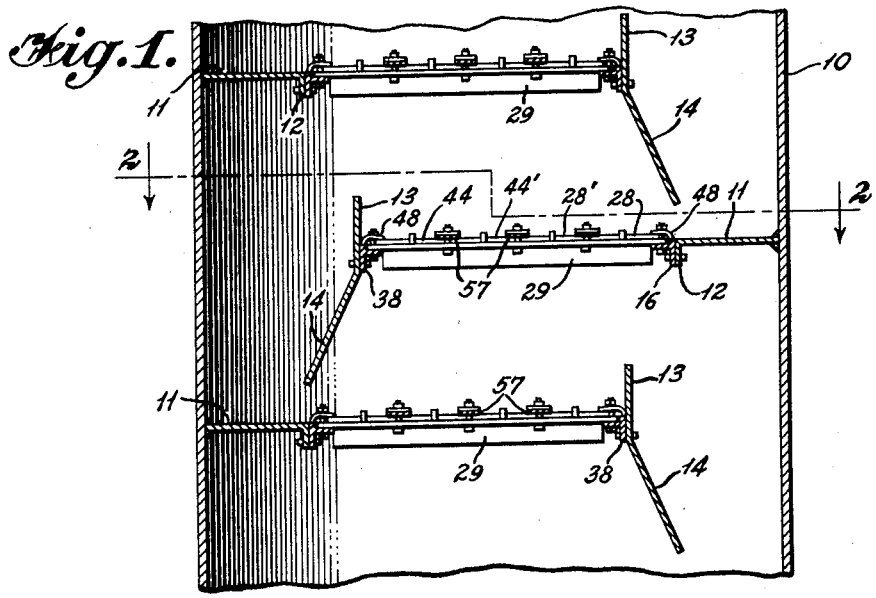
Fig. 1.
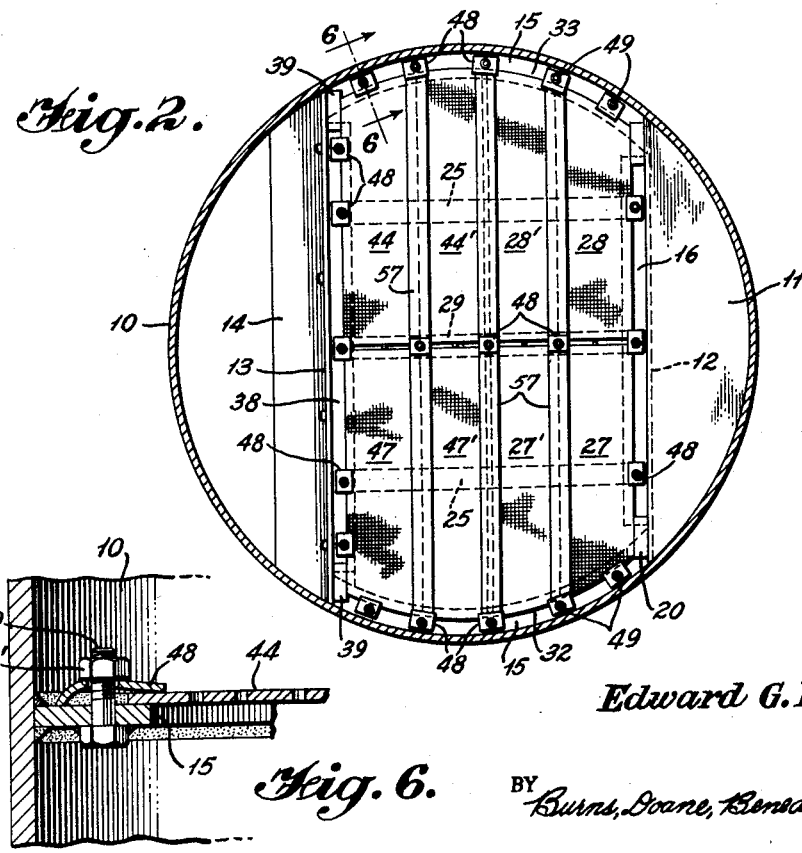
Fig. 2.
Fig. 6.
INVENTOR
Edward G. Ragatz
BY Burns, Doane, Benedict & Irons
ATTORNEYS

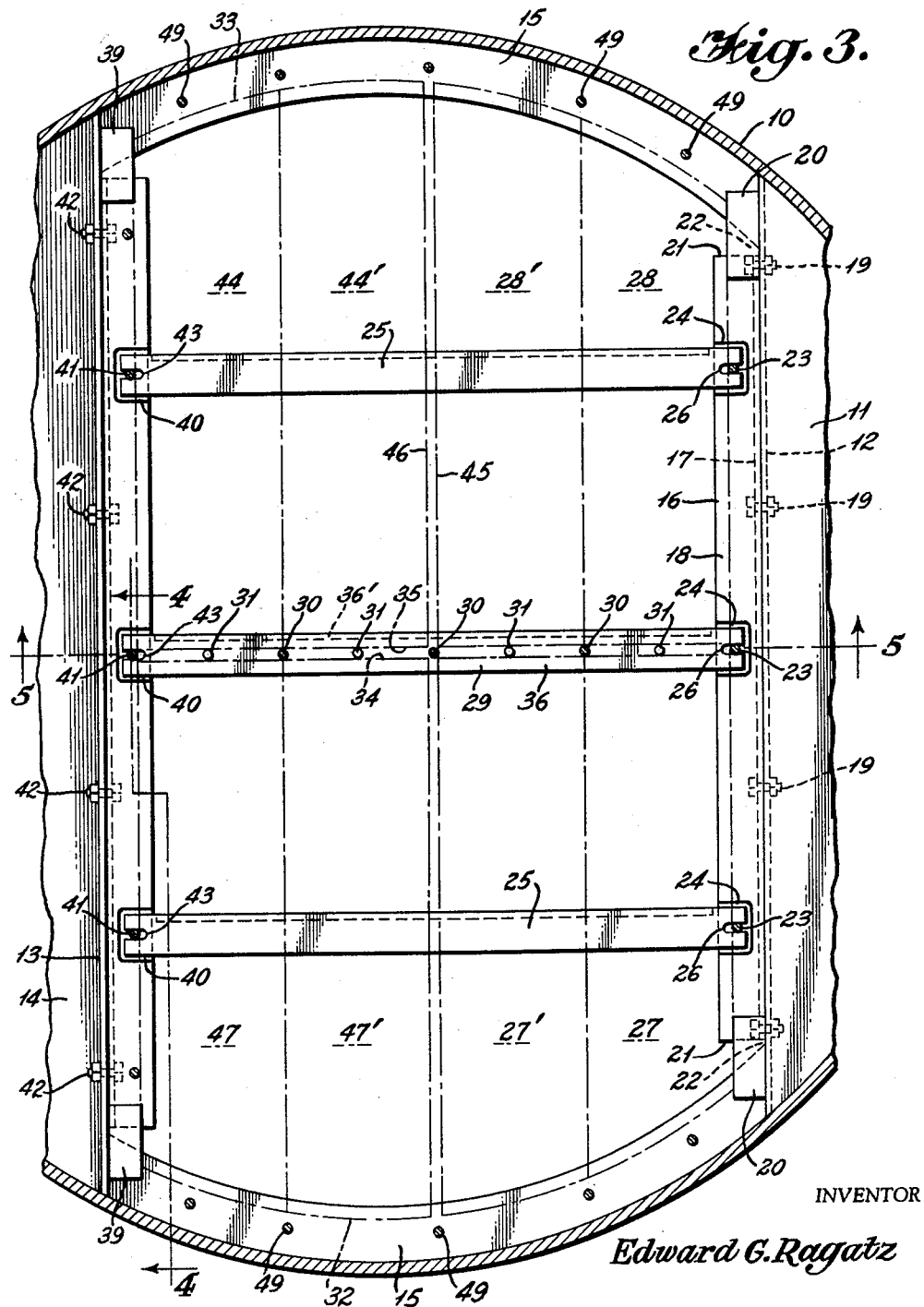

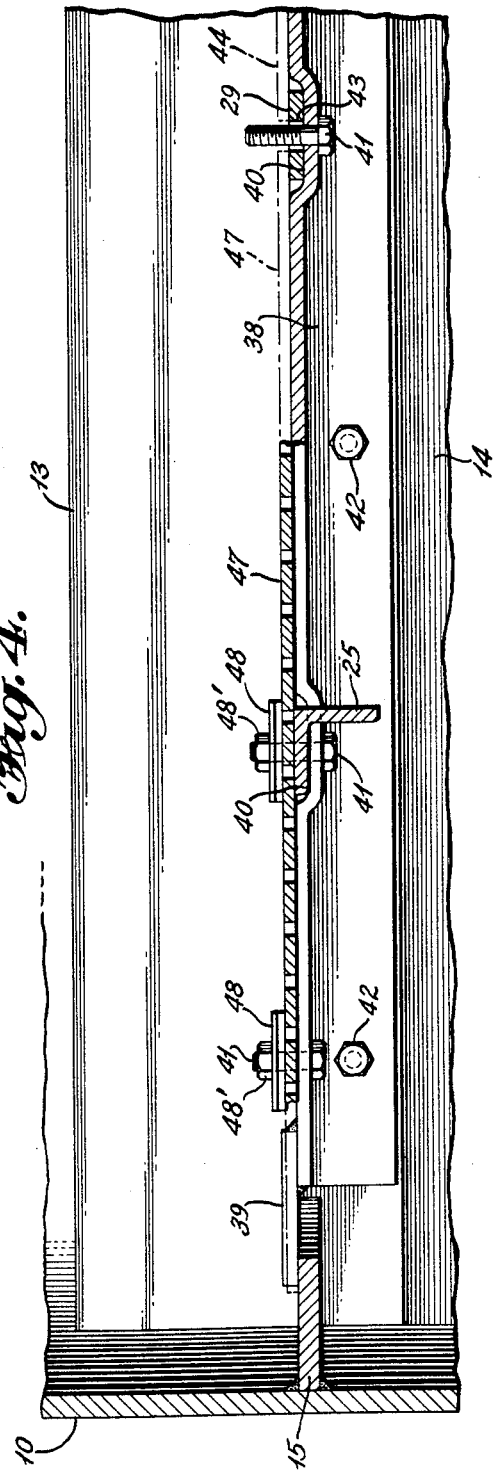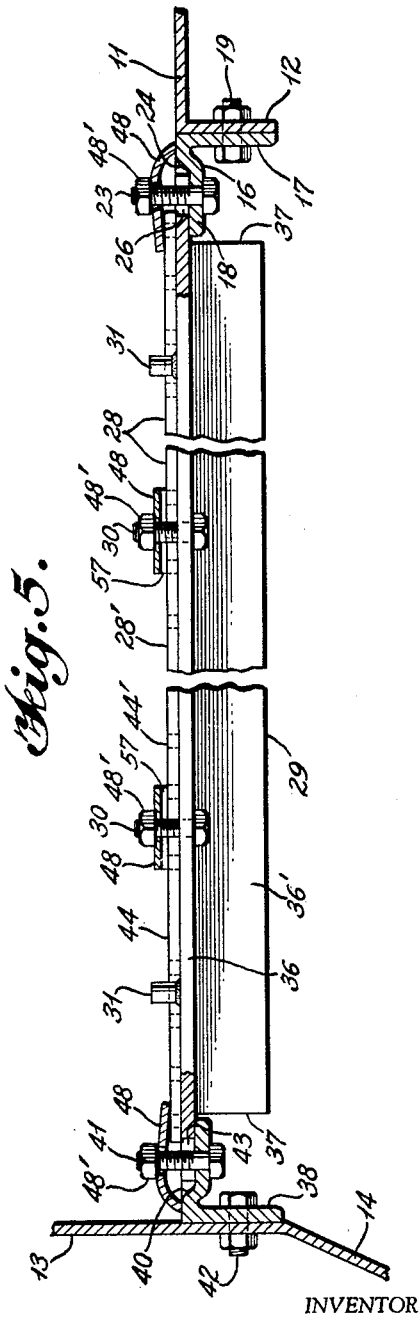

Dec. 8, 1959  E. G. RAGATZ  2,916,272
COLUMN TRAY-STRUCTURE
Filed Aug. 16, 1957  4 Sheets-Sheet 4
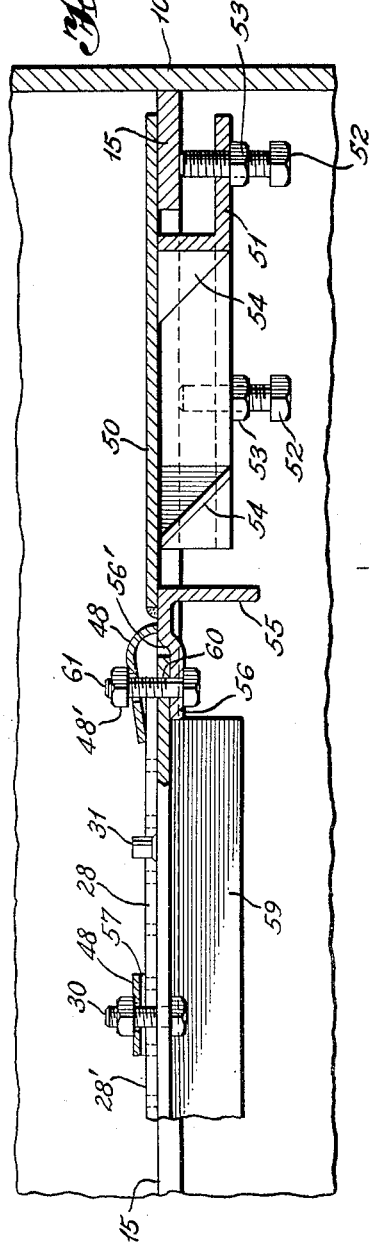
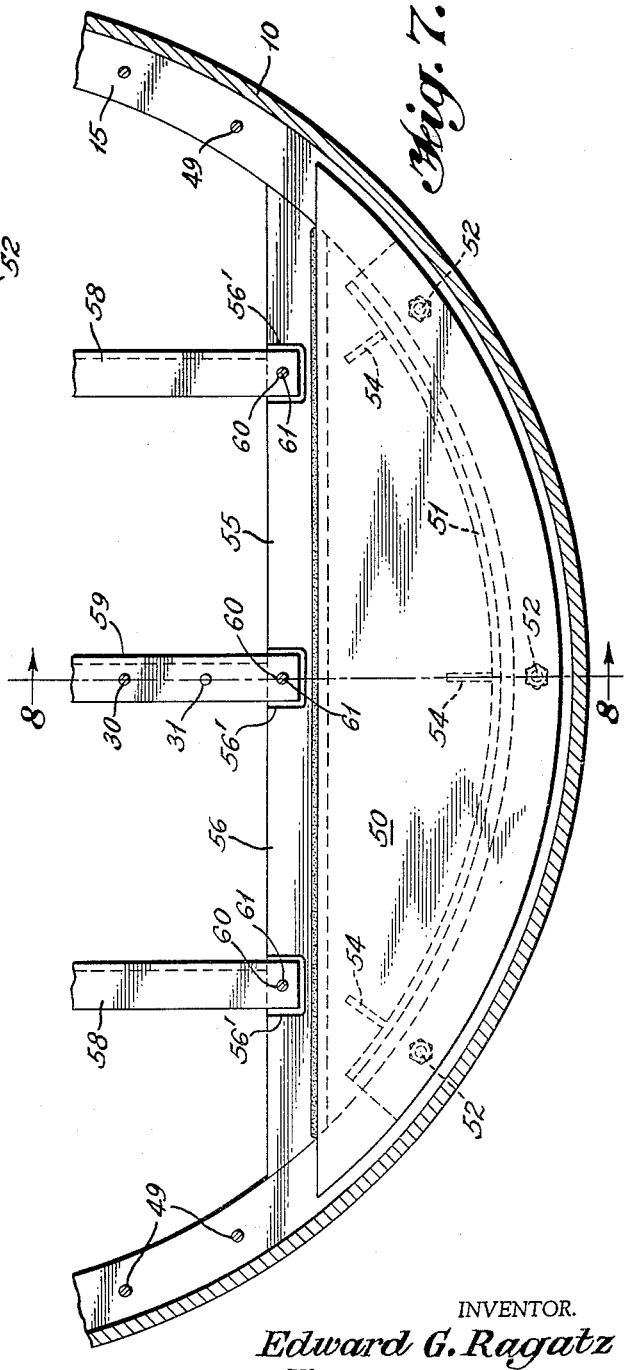
INVENTOR.
*Edward G. Ragatz*
BY
*Burns, Doane, Benedict & Sons*
ATTORNEYS

United States Patent Office 2,916,272
Patented Dec. 8, 1959

2,916,272

COLUMN TRAY-STRUCTURE

Edward G. Ragatz, San Marino, Calif., assignor to Edw. G. Ragatz Co., San Marino, Calif., a partnership Application August 16, 1957, Serial No. 678,587

10 Claims. (Cl. 261—114)

This invention relates to a new and useful improvement in vertical column-tray assemblies such as are employed in fractionating columns, absorption towers, and the like, wherein component interchange is effected between counter-currently flowing vapors and liquids. More particularly it relates to column tray-structures incorporating removable tray-supporting elements. The invention is particularly useful with sectional vapor-liquid contacting tray-decks made of relatively thin-gauge metal.

This application is a continuation-in-part of my copending application Serial No. 515,089, filed June 13, 1955 now abandoned, the disclosure of which is incorporated herein by reference.

Columns for fractionation, absorption, and the like are commonly constructed with superimposed, vertically spaced, horizontal trays designed to conduct liquids first horizontally across a tray and then downwardly and across successive underlying trays in alternate directions, thus forming a zig-zag downward liquid path through the column. Gases or vapors are simultaneously directed upwardly through the horizontally flowing portions of the downflowing liquid for effecting desired countercurrent contacting of the vapors and liquid. Weirs located on alternate sides of the column may be employed for maintaining levels of liquid on the horizontal tray sections through which the uprising vapors flow, while the downflowing liquid may be confined to restricted paths behind said weirs by "downcomers" consisting of more or less vertical aprons attached to the walls of the vessel. The downflowing liquid streams may be intercepted and directed horizontally across the next underlying tray by liquid-receiving plates located beneath said downcomers. Vapors may be admitted to the horizontal vapor-liquid contacting zones via tray-decks provided with conventional bubble-caps, simple perforated-plates, valve-controlled orifices, or the like.

It is an object of this invention to provide removable column tray-elements, including both deck-supporting elements and tray-decks proper, which can be economically constructed in a metal-working shop and which are readily adaptable without subsequent alteration to the variations in column-shell dimensions regularly encountered in normal fabricating practice. Another object is to provide tray-elements which may be secured in the column with a minimum number of make-up bolts or studs and nuts, and particularly with a minimum number of loose bolts and nuts, with adequate allowance being provided for differential expansion and contraction between removable light-gauge metal deck-sections, removable supporting elements for same, and permanently-secured tray-supporting elements of the column, thereby avoiding any danger of buckling of thin deck-plates and/or undue stressing of removable supporting elements under differential heating and cooling conditions of the column structures. The invention further provides a structure in which the major tray-loads are carried to the column shell via bars and bolts or studs under compression and/or shear, thus avoiding potential tray rupture from failure of small diameter bolts carrying tray-loads under tension as in many conventional structures. The invention also provides for automatic common leveling of all elements of the deck-supporting structure. It further eliminates open areas encountered in connection with the securing of flat deck-sections on a removable supporting-grid structure. It allows maximum working room in small diameter cross-flow columns and medium diameter split-flow columns, thereby improving the accessibility and ease-of-installation of trays in such structures.

These objectives are attained by providing removable lateral or transverse secondary supporting-elements carried by fixed elements on the column shell, and which in turn carry removable longitudinal primary supporting-elements to form a removable grid support of the necessary strength for reenforcing and supporting a tray-deck comprised of thin light-weight plate-sections, such, for example, as perforated-plates or other tray-structures of the character of those disclosed in my United States Patents Nos. 2,693,350 and 2,713,478.

The grid-structure is equally applicable for use in columns equipped with permanently-installed liquid receiving-plates, off-flow weirs and downcomer aprons; or to structures in which any or all of these elements are removable. It can also be equally employed in cross-flow or split-flow columns. The manner of attaining these and other objectives will be apparent to one skilled in the art from the description of the accompanying drawings of which:

Figure 1 is a vertical sectional view of a fragment of a cross-flow column, and tray-structures of this invention.

Figure 2 is a plan view taken along lines 2—2 of Figure 1 showing an assembled tray-structure.

Figure 3 is a plan view of the partially assembled tray-structure showing the removable lateral (secondary) and longitudinal (primary) deck-supporting members in position with respect to the receiving plate, off-flow weir and shell-rings. The position of the tray deck-plates is indicated by the phantom or dot-dash lines.

Figure 4 is a sectional view taken along the lines 4—4 of Figure 3 with deck-plates and retaining-clips added.

Figure 5 is a sectional view of a detail of the structure assembly taken along the lines 5—5 of Figure 3 with deck-plates and retaining-clips added.

Figure 6 is a sectional view of a detail of the assembly taken along line 6—6 of Figure 2 showing the manner of removably securing the tray deck-structure to the column ring.

Figure 7 is a plan view of a modification of the invention employing a special removable liquid-receiving plate.

Figure 8 is a sectional view of the removable plate taken along the lines 8—8 of Figure 7.

Referring to Figures 1 and 2, a fragment of a vertical cylindrical column-shell is shown at 10. The column is equipped with the usual inlets and outlets for vapors and liquid, and with manholes and other equipment commonly used in fractionation columns, absorption columns, etc. For purposes of simplification, the entire column is not illustrated. The drawings illustrate the actual number of working parts for a tray assembly for columns of the order of 6-7 feet in diameter, showing the simplicity of the structure of this invention.

Each of the trays, of which only three are shown, is equipped with a receiving plate 11 which may be permanently attached to the shell, for example by welding, as illustrated in this figure, or may be of a conventional removable type or the special type as is shown in Figures 7 and 8. The receiving plate is equipped with a downturned flange 12, to which a removable secondary deck-supporting element is secured, as will be described in greater detail hereinafter. On the opposite side of the tray is an off-flow weir 13 from which depends a downcomer apron 14 to direct liquid from an overlying tray to the receiving plate of an underlying tray. The off-flow weir and downcomer apron may be permanently installed in the column by welding it to the shell and to the ends of the shell-ring 15, or may be of a conventional removable type bolted to apron-bars permanently attached to the column-shell. Apron 14 and weir 13 may be of one piece as shown, or may be separate. Other forms of downcomers may be used, it being evident as to how the present invention may be adapted to use with them. When permanently attached, they are usually installed by the fabricator of the shell. When the removable type is used, they may be mounted in either the shop or in the field. The overflow weir and the apron do not, per se, constitute the novelty of the invention.

Although the embodiment of the column illustrated is of the crossflow type, in which the liquid flows as a single-stream across the complete tray-deck, the invention is also adapted for use with so-called split-flow columns in which the liquid from an overlying tray flows alternately onto receiving plates in the center and on each side of the tray, thus splitting the liquid-flow into two streams, each flowing across one-half of the tray-deck. With this construction, weirs and downcomers are located similarly at the sides and center of the column in keeping with the split liquid-flow. This type of operation is well known in the art, and is used particularly with trays of larger diameter. It is not illustrated, since it will be evident as to how the invention may be adapted to such split-flow columns.

Adjacent the liquid receiving plate 11 is provided a removable lateral secondary deck-supporting element 16 which, as illustrated in Figure 5, may be in the form of an angle having a horizontal flange 18 and a vertical flange 17, which mates with flange 12 of receiving plate 11. These may be joined, as shown, by a stud 19 welded or otherwise attached to one of the flanges, or by loose bolts and nuts. Preferably bolts are used with the heads tack-welded to flange 17 at the shop, the nuts being applied when the element is mounted. Only a few bolts need be used. Some of the tray load is borne by these bolts, but being in shear, the danger of failure is remote even though they become badly corroded.

The major part of the load supported by lateral secondary deck-element 16 may be borne by the ears 20, which are welded or otherwise secured in the shop to the top of flange 18 at each end. These ears are of sufficient length to rest upon and be supported by shell-ring 15 and thus transfer the lateral-angle load to the column-shell via shear and compression. Bolts 19 prevent them from shifting so they need not be secured to the shell ring, thus simplifying the fabrication problems. While it is possible to cut the ends of element 16 on a radius conforming to the curvature of the shell ring, it is advantageous to cut them more or less square, as shown at 21, with the length of element 16 being such that there is a small gap left between the end of the element and the shell-ring as shown at 22 in Figure 3. This allows for come and go due to variations in the shell dimensions, and/or contraction and expansion due to temperature changes. The ears cover any opening not covered by the tray-deck sections, thus preventing undue bypassing of vapor and/or liquid past the edge of the tray-deck.

One edge of ears 20 is set flush with the back of the angle 16 so that the ears are flush with the forward edge of receiving plate 11. This is readily and accurately done in the shop. The ears are narrower than flange 18 with the forward edges being in line with the outermost element of vertical-studs 23, as shown. They are sufficiently long to overlap shell ring 15, but are cut short enough to allow for dimensional variations of the column-shell, and for expansion when the column is heated to bring it on stream.

Recesses 24 are provided in flange 18 at suitable intervals. These recesses are of appropriate depth and dimension to receive the ends of the longitudinal primary deck- or plate-supporting members 25 and 29 and hold them flush with the top of flange 18 thus forming a flat, level deck-supporting grid. The recesses are readily formed by suitable dies and presses in the fabricator's shop. Members 25 are provided with a slot 26 through which retaining stud 23 projects. The latter may be similar to securing means 19 and can be attached at the shop. The tray deck-plates 27 and 28, indicated in Figure 3 by the dot-dash lines, are placed so that the right hand edges rest upon the upper face of 18 and fit snugly against the forward edges of ears 20 and studs 23. These deck-plates comprise the vapor-admitting portions of the tray. Thus, the ears mask any space between the ends 21 of the member 16 which is not covered by the active section of the tray, preventing leakage or bypassing of liquid or vapors.

On the off-flow side of the column is a similar lateral member or element 38, also illustrated as an angle section, which may be removably secured to weir 13 by bolt and nut assembly 41 and 42 similar to 19 and 23. Element 38 is provided with recesses 40 and studs or bolts 41 to receive slotted end 43 of members 25 and 29, the opposite ends of which rest in recesses 24. The ears 39 are similar to ears 20, and rest upon shell ring 15.

Across the center of the column is a longitudinal primary plate-supporting element 29 upon which the inner ends 34 and 35 of the tray-deck sections rest. The element is provided with studs or bolts 30 and may be further provided with stops 31, the function of which serve as guides to aid in mounting the plates in their proper position during tray assembly.

The outer ends 32 and 33 of the tray-deck sections are cut in general conformity with the curvature of the shell while the ends 34 and 35 are cut square. The sections are cut to such a length that they will rest on flange 29 and the shell ring 15, but short enough so that they will not abut the studs 49 in the shell ring, thus again providing clearances for variation in the dimensions of the column and differential thermal expansion and contraction of the tray-elements.

The central longitudinal supporting member is shown as an angle 29 having an upper flat horizontal flange 36 and a depending flange 36'. It need not be of this particular shape since in certain instances a flat bar, a truss or other suitably prefabricated supporting structure could be used as will be evident. The ends of flange 36 are slotted and rest in recess 40 in the lateral supporting element 38, as in the case of members 25. The depending flange 36' is cut slightly short, as shown at 37 in Figure 5, to allow some clearance between it and the horizontal flanges of the lateral supporting members. The same is true of members 25. The recesses are sufficiently long to afford ample clearance of the ends of flange 36. This contributes to ease in assembly and allows for dimensional variations, and for expansion and contraction.

As illustrated, eight tray-deck sections are shown, although as many can be used as may be required. These sections are of a width to conveniently pass through a manhole of the column, and when assembled on the supporting grid, to leave a space as between edges 45 and 46 of Figure 3 to provide for longitudinal dimensional variations and/or differential expansion and contraction. As shown (Figures 4 and 5), they are simple perforated plates, but, as previously mentioned, this is for illustrative purposes only. The deck-sections may be of any suitable design to comprise vapor-admitting elements. The particular structure or design of the vapor-admitting deck is not a part of this invention.

To assemble the tray, the secondary deck-supporting members 16 and 38 are placed in the column with the ears 20 and 39 resting on shell-ring 15, thus automatically "leveling" their upper surfaces with shell-ring 15. The members are secured in position via bolts 19 and 42 passing through prepunched holes in angle-leg 12 and weir-plate 13, respectively. The retaining washers and nuts are applied and tightened in the usual way. The attachment is to weir plate or to the skirt and the terminology used herein is intended to embrace either.

The members 29 and 25 are next dropped into position with the ends resting in recesses 24 and 40, and with the slots at either end embracing the bolts 23 and 41. Any small dimensional variation in the distance between the receiving plate and weir is compensated for by the slots. The longitudinal members are cut short enough to allow a margin between the ends and back edges of the recesses, and between the angle-edges and legs 36. They automatically assume their correct level position with the upper surfaces of shell-ring 15, and lateral members 16 and 38, due to the die-controlled depth of recesses 24 and 40, thus forming a uniform supporting-grid surface for the tray-deck sections.

The deck sections 27 and 28 are then laid in position with the right hand edge snug against the members 20 and studs 23. In large columns, using a number of sections, the plates 47 and 44 can be simultaneously placed on the opposite side of the column. The bolts and stops in the grid-members and shell-ring, and the ears at the ends of the lateral members, serve as guides so that the minimum of time and effort is required to properly position the sections. The plates 27', 28', 47' and 44' are next placed in position with their right-hand and left-hand edges, respectively, placed snugly against the adjacent edge of the mating plates 27, 28, 47 and 44, respectively. In this way each deck can be laid quickly and easily, working from each side to the center. The combined width of these plates when finally assembled is such that a small gap remains between the edges 45 and 46 of the center plates. This allows for variations in dimensions in the permanent column elements, and also permits come and go due to expansion and contraction resulting from temperature changes in operation, thus preventing plate rupture due to buckling of the plate-sections.

It should be understood that while two of the members 25 and one of members 29 are shown, as many more as might be needed could be used in larger columns, or less in smaller columns, with the illustrated arrangement applying to columns of the order of 72–84 inches in diameter. Furthermore, the deck-plates may be of any desired length, provided however, that they are supported at the ends and, if necessary, at one or more intermediate points. Since the column rings and the supporting elements are by virtue of this construction all on the same level, the mere placing of the plates automatically levels them.

The sealing strips 57 (Fig. 2) are next laid in place. These are narrow strips (say 2 to 2½ inches wide) of the same length as the perforated-plate sections. They are employed to prevent bypassing of upwardly rising vapors through any gaps between the plate sections.

The final steps in the tray-assembly consist of securing the plate-sections and grid members together, and to the permanently-installed tray-supporting members. This is done by means of relatively wide spring-clips 48 placed over the bolt-studs 49 around the perimeter of the shell, the bolt-studs 23 and 41 along the lateral supporting members, and bolt-studs 31 on the longitudinal-supporting member 29, and made up tight with nuts 48', as illustrated in Figures 4 and 5. Being relatively wide, comparatively few clips are needed. The spring-clips thus compressed, firmly hold the plate-sections in position, as shown. At the same time the spring action of the clips permit slippage of the plate-sections without buckling as they expand or contract due to changes in temperature. The tray load is borne by the supporting elements and the shell, not by the bolts, so that if a bolt does fail no particular harm results. Thus tray rupture is minimized.

As previously pointed out, the tray weirs, downcomer aprons, and liquid receiving plates may be either permanently secured in the column-shell or removably bolted in place. The bolted removable elements are usually employed in columns subject to severe corrosion.

For economy, light-weight alloy receiving plates are preferably employed in the more corrosive services. In certain such services (as a mine treatment of sour natural gas) the ratios of liquid to vapor handled by the column-trays may be quite small. Under these circumstances, care must be exercised to assure elimination of all bypass leakage of liquid around the edges of the liquid-receiving plates. Conventionally this is accomplished by employment of suitable packing between the edge-surface of the receiving plates and the underlying shell-ring, with a large number of bolts or a heavier "backing-ring" being needed when the receiving-plate is of light-weight material.

Figures 7 and 8 illustrates a special design of a removable liquid receiving-plate vehicle when constructed of light-weight material which can be made up "liquid tight" with a relatively few bolts and without employment of packing between the plate and shell-ring.

This receiving plate 50 has an arcuate peripheral edge and a substantially straight edge with the arcuate edge being generally concentric to the inner wall of the tower and to the supporting shell-ring. A retaining angle 51 is secured to the underside of the plate 50 and said retaining angle is generally arcuate and follows the curvature of the ring so as to extend under the marginal curved portion thereof. The lateral flange 51 of the angle is spaced from the underside of the receiving plate 50, as shown in Figure 8, and a plurality of set screws 52 are threaded through the lateral flange of said angle, with a lock nut 53 on each set screw below said flange. If desired, suitable gussets 54 may reinforce the attachment of the retaining angle 51 to the underside of the receiving plate.

In mounting the receiving plate upon the supporting ring, the marginal edge portion of the plate 50 is placed in overlying relationship on the supporting ring 15 and this disposes the set screws 52 which are carried by the retaining angle 51, below said ring. It is noted that the set screws are accessible from underneath the receiving plate and may be tightened from the underside of the tray assembly. By tightening the set screws, the entire curved marginal edge portion of the receiving plate, which overlaps and rests upon the supporting rim or ring 15, is pulled downwardly into tight sealing engagement with said ring; the set screws are located in desired spaced relation on the retaining angle and equally distribute the tightening pressure throughout the marginal area of the plate to assure a leak-tight seal of the plate with the support obviating the need for sealing gaskets.

As explained, the receiving plate is generally arcuate in shape, and its inner straight edge extends transversely or laterally across the interior of the tower. This inner edge has a supporting angle 55 welded thereto and the horizontal flange 56 of the angle projects inwardly from the edge of the plate. A plurality of recesses 56' are formed in the upper surface of flange 56 of the supporting angle and studs 61 project upwardly from these recessed portions for receiving the longitudinal supporting members 58 and 59 of the tray-deck supporting grid as previously described in connection with members 25 and 29. It is noted that the upper surface of the flange 56 lies in the same plane or is flush with the upper surface of the shell ring to provide a level supporting surface for the tray-deck elements, as previously described. The ends of the elements 58 and 59 are provided with bolt holes 60 to receive studs 61. The other ends of the elements 58 and 59 may be similarly constructed. When the receiving plate has been placed in its approximate position, the longitudinal elements are put in place. At this point it is possible to swing or slightly rotate the receiving plate 50 so that the elements 58 and 59 are at right angles to the secondary elements, after which the set screws are tightened. The deck sections are then put in position and the necessary clips and nuts (not shown) applied, as previously discussed.

Having described and illustrated my invention, it is not to be interpreted as limited to the exact form or embodiments shown herein, but such variations can be made as will be apparent to one skilled in the art.

I claim as my invention:

1. A tray assembly for a vessel including a vertically disposed weir secured within the vessel and extending transversely across the interior adjacent one side thereof, a shell-ring having its periphery abutting and attached to the wall of the vessel with its ends abutting said weir, a removable liquid-receiving plate having a curved edge concentric to the wall of the vessel whereby such portion may overlie a part of the shell-ring, the inner edge of said plate being straight and substantially parallel to the weir when the plate is in position and supported by said ring, a supporting angle removably secured against and parallel to the weir, an angle bar extending between the supporting angle and receiving plate and having its ends pivotally attached to the supporting angle and plate, whereby the position of the plate and said angle bar may be adjusted within the vessel, and means for clamping the plate in final position within the vessel after said plate and angle bar have been positioned.

2. A tray assembly as set forth in claim 1, wherein the means for clamping the plate in final position is operable from beneath said plate.

3. A tray assembly as set forth in claim 1, wherein the means for clamping the plate in final position comprises a retaining angle secured to the underside of the curved edge of the plate whereby said retaining angle is disposed below the shell-ring when the plate is resting upon the element, and clamping studs threaded within the retaining angle and adapted to be moved into engagement with the underside of the shell-ring to sceure the plate to the ring.

4. A tray assembly as set forth in claim 1, wherein the upper surfaces of the supporting angle and the angle bar lie in the same plane as the upper surface of the shell-ring, a tray-deck comprising plurality of vapor admitting plates mounted upon said angle, said angle bar and the ring, and means for frictionally securing said plates in mounted position whereby they are free to expand and contract differentially with respect to said angle, angle bar and shell-ring.

5. A vapor-liquid contacting tray assembly comprising a tray-supporting assembly in a vapor-liquid contacting column comprising a liquid receiving plate, a downcomer apron opposite said plate, a shell ring rigidly attached to the shell of said column, secondary deck-supporting elements releasably secured against and parallel to said receiving plate and said downcomer apron respectively, said secondary elements being supported by the shell ring, the upper tray supporting surfaces of said elements being positioned flush with the surface of the shell ring, each of said elements being provided with a downwardly offset recess oppositely disposed to one another, a flat surfaced primary tray-deck supporting element extending longitudinally between said secondary elements with its ends resting in said recesses, said recesses being of such depth that the surface of the primary element is flush with the surfaces of said secondary elements whereby the tray load is transferred from said primary element to said secondary elements with the surfaces of said primary elements, said secondary elements and said shell ring being in a common plane and each providing a shelf upon which flat tray-deck sections may rest in a horizontal plane, a vapor admitting tray-deck comprising a plurality of flat-bottomed plate sections of a width to conveniently pass through a manhole in said column, said sections being placed in side-by-side relationship to form the main tray-deck, and means for frictionally securing the tray-deck sections to said shell ring and said secondary and primary elements at points where said sections rest upon the upper surfaces of said shell ring and said elements.

6. The structure of claim 5 wherein said secondary deck-supporting elements are provided with an upwardly-offset extension at each end overlapping and resting upon said shell ring to assist in transferring the tray load to the column shell, said offsets being such that the upper surfaces of said elements are positioned flush with the upper surfaces of the shell ring.

7. The structure of claim 6 wherein said upwardly-offset extensions of the secondary elements are in the form of ears attached to the upper surfaces of said elements adjacent each end.

8. The structure of claim 5 wherein upwardly-extending studs are mounted in said recesses and the ends of said primary elements are provided with openings for receiving said studs.

9. The structure of claim 8 wherein clip-members coact with said studs to simultaneously secure both the ends of said primary elements in said recesses, and the edges of over-lying tray-deck sections on said elements.

10. The structure of claim 5 wherein upwardly-extending studs are provided on said shell ring and said primary and secondary elements, said studs being disposed at a sufficient distance from the edges thereof to permit the end and side edges of tray-deck sections to rest upon the flat surfaces of the edges of said members, whereby said tray-deck sections may be placed in proper alignment when laid thereon, and spring-clip means coacting with said studs to frictionally secure the sections to the members at their edges.

References Cited in the file of this patent

UNITED STATES PATENTS

| | | |
|---|---|---|
| 2,008,557 | Lambert | July 16, 1935 |
| 2,210,808 | Glitsch | Aug. 6, 1940 |
| 2,491,726 | Glitsch | Dec. 20, 1949 |
| 2,611,457 | Glitsch | Sept. 23, 1952 |
| 2,611,596 | Glitsch | Sept. 23, 1952 |
| 2,710,678 | Rapisarda | June 14, 1955 |